April 4, 1944.  T. A. BRYSON  2,346,005
VORTEX SEPARATORS
Filed Aug. 15, 1940   3 Sheets-Sheet 1

INVENTOR
T. A. Bryson
BY
Morgan, Finnegan + Durham
ATTORNEY

April 4, 1944.  T. A. BRYSON  2,346,005
VORTEX SEPARATORS
Filed Aug. 15, 1940  3 Sheets-Sheet 2
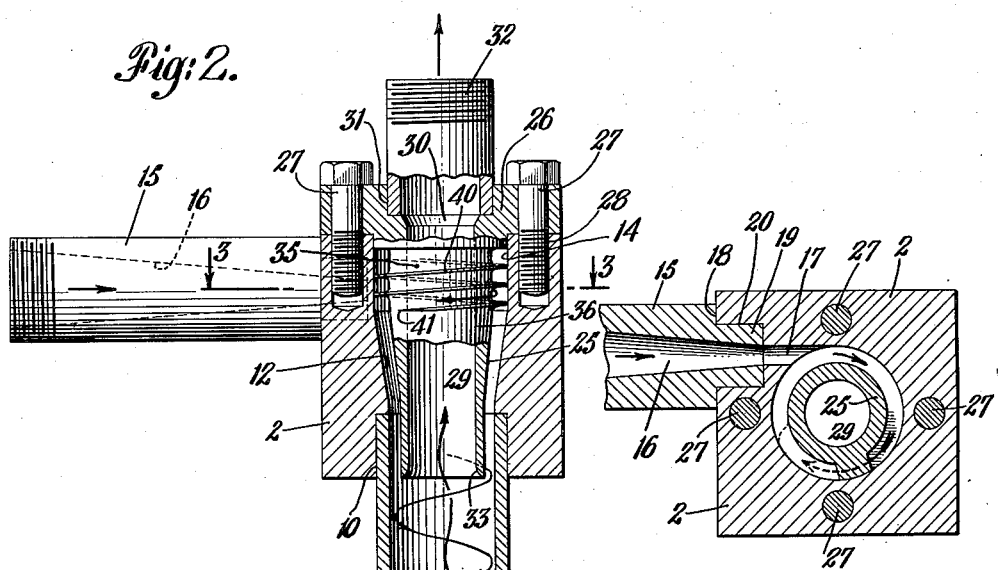
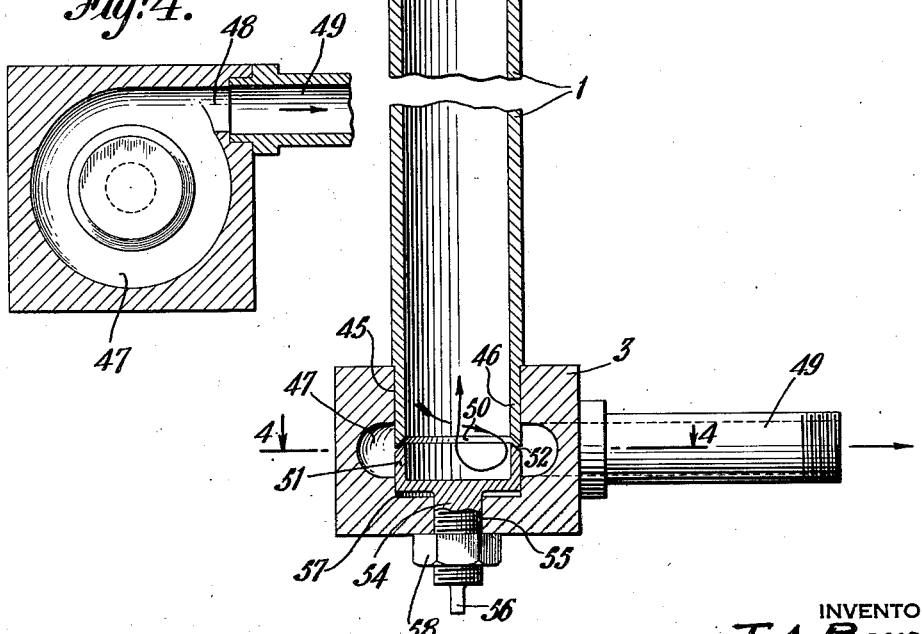
INVENTOR
T. A. Bryson
BY
Morgan, Finnegan & Durham
ATTORNEY

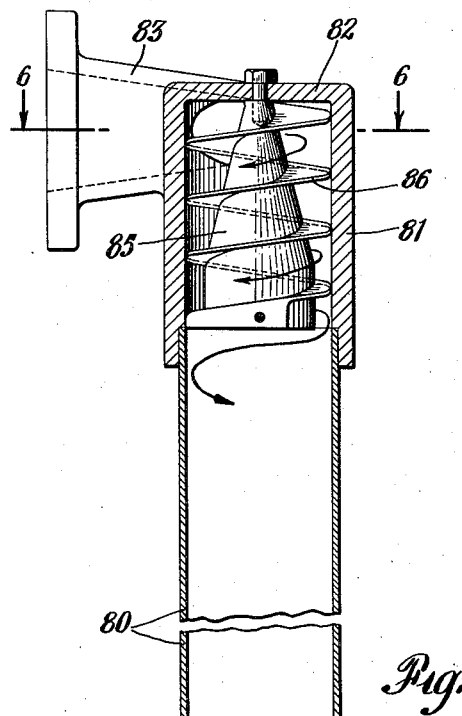
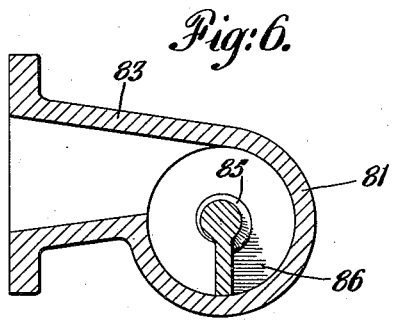
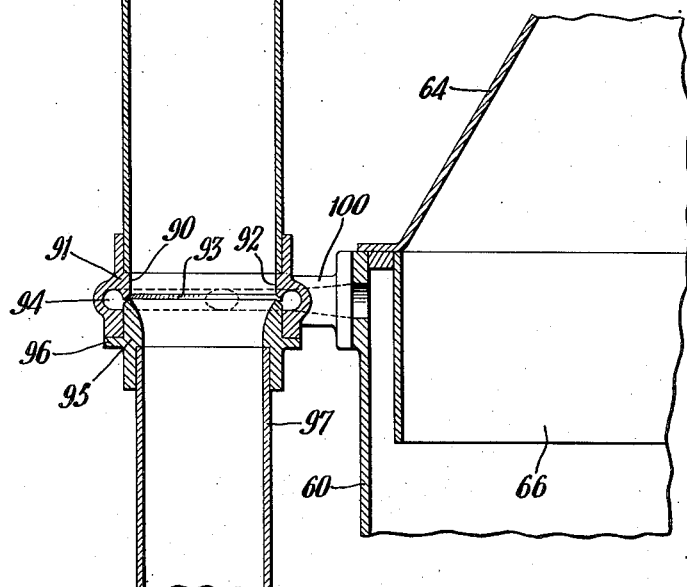

Patented Apr. 4, 1944

2,346,005

UNITED STATES PATENT OFFICE 2,346,005

VORTEX SEPARATOR

Tandy A. Bryson, Troy, N. Y.

Application August 15, 1940, Serial No. 352,698

23 Claims. (Cl. 210—51)

The invention relates to separating by centrifugal action materials of different specific gravities in a fluid suspension. More particularly the invention relates to a novel and useful separating process and apparatus of the so-called "Vortex" type wherein centrifugal action is induced by imparting a swirling spiral or helical movement to a liquid suspension passing through a stationary tube or cylinder.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is an enlarged vertical section of the centrifugal separating cylinder and attached devices comprising part of the apparatus shown in Fig. 1;

Fig. 3 is a horizontal section on line 3—3 of Fig. 2;

Fig. 4 is a horizontal section on line 4—4 of Fig. 2;

Fig. 5 is a vertical section of a modified form of separator in which axial travel of the fluid being treated is uni-directional;

Fig. 6 is a horizontal section on line 6—6 of Fig. 5; and

Figure 1:
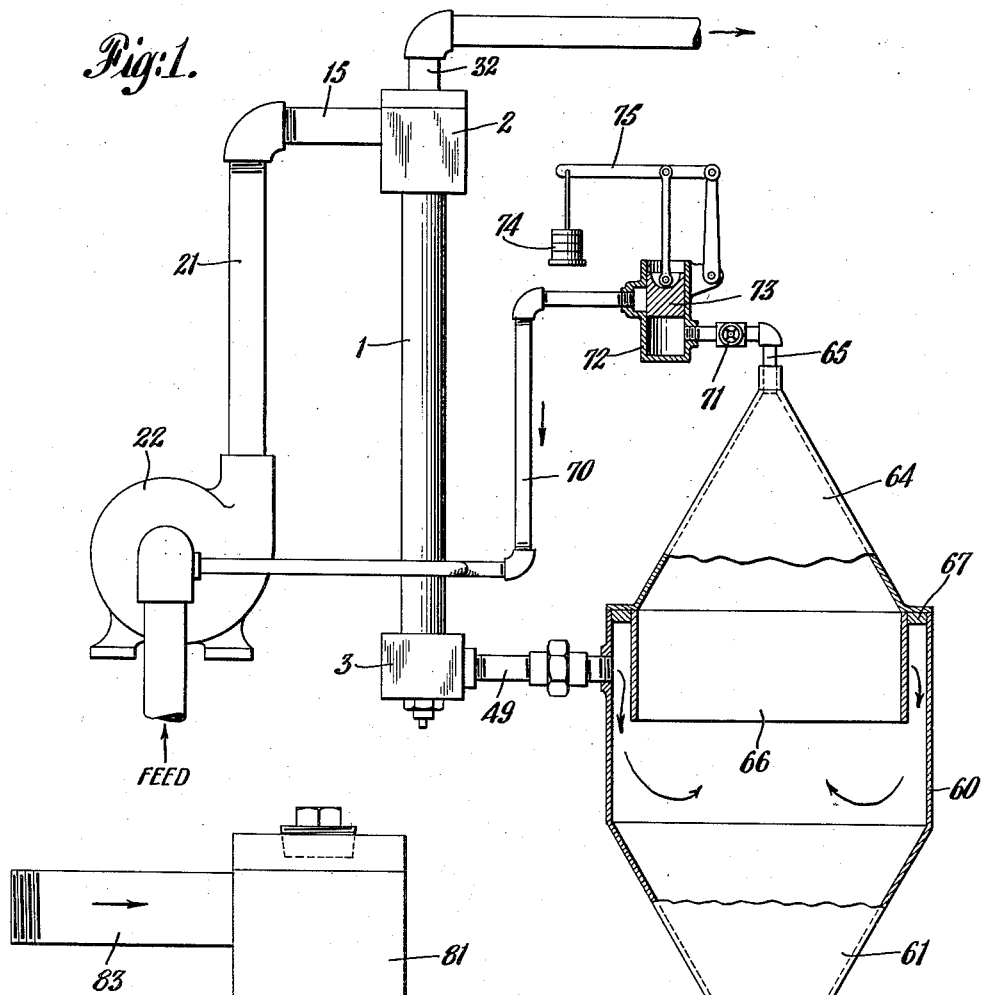
Fig. 1 is an elevation, with parts in section, of an apparatus embodying the invention.

While the invention is generally applicable to the separation of heavier particles or constituents from a fluid suspension of solid particles in either liquid or gas, it is particularly applicable to the separation of heavier solid impurities from a suspension of paper-making pulp or fibre in water, usually called a paper stock suspension. One of the serious problems in paper-making is the separation of solid heavy impurities such as particles of sand and grit, metal, knot particles and the like from paper pulp suspension. The problem is commercially difficult because the proportion of impurities to the suspension is very small, and therefore it is necessary to treat an exceedingly large quantity of fluid at low cost. Usually the proportion of impurities is in the order of one to five pounds of impurities per dry weight ton of fibre. Paper stock suspensions are usually treated at a consistency in the order of one-half percent; that is, 200 lbs. water per pound of fibre or 400,000 lbs. water per ton of dry fibre, which is to say that the percentage of impurities is in the order of one-four thousandth to one-eight hundredth of one percent of the paper stock.

On the other hand, it is most important to remove substantially all the impurities because the presence of particles of sand or the like in the paper product is very detrimental to the quality of the paper and in subsequent use of the paper in printing presses, wrapping machines and the like.

As another example of its applicability the invention is beneficial in the clarification of raw sugar juices.

One object of the invention is to provide process and means for separating impurities from paper stock suspension, raw sugar juices and similar fluids with a minimum of expensive apparatus, utilizing mechanism having virtually no moving parts, yet capable of handling rapidly and economically a very large quantity of the fluid suspension. Another object of the invention is to provide for the accurate and nice control of the separation of the desired fraction containing the impurities, together with the minimum amount of the suspending fluid containing no impurities, so that the separated fraction will have a relatively high concentration of impurities which, if desired, can be subjected to further separation or retreatment action.

More specifically the objects of the invention are to provide improved steps and means for centrifugal separation of impurities in a fluid suspension by means of the "Vortex" principle wherein annular bodies of the fluid are forced under high pressure to swirl in a helical path within the confines of a stationary cylindrical tube or chamber. In separators of this type a very high velocity head is imparted to the swirling mass of fluid so that the centrifugal force developed by the movement of the liquid effects a very substantial multiplication of the force of gravity, while the radial travel required for the heavier particles to reach the periphery of the swirl is very short because the annulus occupied by the swirl is radially thin. The invention provides these conditions conducive to radial subsidence of the heavier particles in combination with a separator cylinder which is of relatively great length and small diameter and within which the fluid is caused to travel on a relatively long helical path without interruption or turbulence so that the maximum centrifugal separating effect may take place undisturbed. One feature of the invention is to provide an improved method and means for imparting the most compact form to the annular swirl of fluid while at the same time imposing and maintaining therein a relatively high angular velocity.

The invention further provides novel and highly effective means for separating or skimming off the peripheral fraction of the fluid containing the impurities which have been subjected to the maximum centrifugal separating action. Said skimming means is designed to offer virtually no interference with the orderly course of the fluid travelling through the separating cylinder, thus avoiding any disruption or local disturbance in the separating action.

One object of the invention is to provide such skimming means which can be nicely controlled and regulated as to capacity for discharge and selectivity in skimming a greater or less quantity of material from the rotating annulus of fluid, depending upon the pressure used, the materials being treated and other factors and conditions of the separation. Such controls for the skimming action are fundamentally two in number, one being the regulation of the size of the skimming outlet or orifice through which the separating fraction of the suspension is caused to pass and the second being the provision of means for regulating the pressure drop across the skimming orifice by imposing and maintaining a pressure on the discharge or outlet side of the orifice which is appropriately correlated with the discharge pressure or centrifugal expelling force at the entrance to the skimming orifice within the separating chamber.

Other objects of the invention are to provide a complete apparatus in which the novel "Vortex" type separating cylinder constitutes the primary separating unit associated with auxiliary mechanism for handling the primarily separated constituents of the original suspension, including subjecting the separated fraction containing the impurities to one or more retreatments in the same or a secondary separating unit. Another object is to apply the principles and novel features of the invention to Vortex separators having either a double or single traverse of the fluid; that is to the type wherein the fluid recirculates as a core of the cylindrical chamber to discharge at the feed end and also to the type in which the fluid passes once throughout the length of the cylinder and is discharged at the end opposite that at which it is introduced.

It will be understood that the foregoing general description and the following detailed description as well are exemplary and explanatory of the invention but are not restrictive thereof.

Referring now in detail to the present preferred embodiment of the invention illustrated by way of example in the accompanying drawings, a preferred form of separating cylinder with associated feed and discharge means is shown in Fig. 2. As embodied, the principal elements of the separator comprise a relatively long and interiorly smooth cylinder or tube 1; a feeding unit or head 2 at the upper end of cylinder 1; and a discharge or skimming unit 3 at the lower end of the tube 1. The interior diameter of the tube will vary in accordance with the nature of the material being treated and the centrifugal force required, i. e., for paper stock, where a relatively low centrifugal force is needed, the tube may be of about four inches interior diameter, thus providing high capacity. With more resistant suspensions such as raw sugar juices, the tube may be of a diameter of the order of one inch, providing a relatively very high centrifugal force.

Referring first to the feed unit 2, means are provided therein for imparting to the fluid suspension a relatively high velocity head and simultaneously preforming the tangentially moving stream of fluid into a whirling annulus having an angular velocity relatively high compared to its axial travel along the interior of the cylinder 1 into which it is fed. A primary function of the feeding unit 2 is accurately to preform the swirling annulus of fluid and to deliver it to the cylinder 1 in the optimum condition for the centrifugal separating action. The feeding unit comprises the rectangular block 2 which is bored at 10 to receive and tightly fit about the upper end of the cylinder 1. Above the end of cylinder 1 the bore 12 of block 2 increases in diameter, flaring upwardly to merge with a cylindrical bore 14 of the maximum diameter. A fluid feed nozzle is formed as a tapered bore 16 within the cylindrical member 15, extending normal to the axis of cylinder 1. The smaller end of the nozzle is designed to communicate with a passage 17 which lies tangent to the periphery of the bore 14 (Fig. 3). As shown, the inner or right hand end of the member 15 is shouldered at 18 to abut against the edge of the block 2, the reduced portion 19 being tightly seated in a recess 20 bored into the block 2 and centered with respect to the tangential passage 17. The opposite or outer end of the nozzle tube 15 is threaded to connect with a feed pipe 21 (Fig. 1) which communicates with a pump 22 designed to impart the desired pressure head to the feed fluid.

In accordance with the invention means are provided for preforming the tangentially injected stream of fluid into a whirling annulus before it is delivered to the cylinder 1. Said preforming means are also associated with means for effecting the ultimate discharge of the axially disposed core or mass of the purified lighter liquid suspension which has passed through the cylinder 1 and returned to the upper end for discharge. As embodied, a tuyère 25 is mounted to extend downwardly through the frustro-conical bore 14, 12, 10 of the block 2. Said tuyère comprises a square upper end block 26 adapted to be fitted on the top of the block 2 and secured thereto by four screw bolts 27 which pass through appropriate bores in the block 26 and are threaded into tapped holes 28 in the upper portion of the block 2. The tuyère further comprises a tubular member 25 having throughout its length a cylindrical bore 29 of uniform diameter except for a slight chamfer 30 at its upper end where it communicates with an enlarged recess 31 for receiving a discharge pipe or nipple 32; and a slight flare 33 at its lower end where it extends into the mouth of the cylinder. The outer surface of the tuyère 28 is spaced from the bore of the head 2 to afford passage for the fluid therebetween, and said outer surface is contoured substantially in conformity with that of the bore of the head block 2. Thus the upper part 35 of the tuyère is cylindrical to conform to the cylindrical bore 14 while the intermediate part 36 is tapered in conformity with the conical bore 12 but the angle of the taper is somewhat different so as to provide a gradually narrowing annular passage for the fluid between the surface 35 and the surface 12. The lower end portion 33 of the tuyère is cylindrical and uniformly spaced from the upper end portion of the cylinder 1 within the recess 10.

In the cylindrical space between the surface 14 and the tuyère surface 35 I provide a helical thread or flange 40 which provides a helical conduit for the passage of the injected fluid from the mouth of the tangential passage 17 to the lower end of the thread 40, thereby giving the injected fluid a downward swirling motion as indicated by the arrow. It will be noted that the flange 40 seals the spaces between the bore 14 and the tuyère wall 35 so that the fluid is constrained to follow exactly the downward spiral course of the thread 40. The lower end of the thread 40 tapers to a terminus 41 just at the beginning of the tapering space between the bore 12 and the surface 36 of the tuyère. Thus the injected fluid is caused to spiral in a cleanly compacted annulus through the diminishing bore of this tapered space so that as it passes downwardly from the screw thread 40 into the upper end of the chamber 1 its angular velocity is increased, thereby off-setting the loss of velocity by friction in the upper part of the tuyère.

The compact, annular whirl presented by the tuyère to the tube 1 retains its annular form as it spins down to the bottom of said tube. The actual sectional area occupied by this whirl will probably change during this passage down the tube and, in consequence, the pitch of this helix will change. (Or, the pitch will change and, in consequence, the sectional area will change—the inter-relationship of these changes being immaterial to this description.) The basic cause of these changes and of a change in angular velocity of this whirl is due to a loss of energy through friction as the whirl passes downwardly.

When this outer whirl reaches the closed bottom of the tube, it must move to the central core of the above-described annulus and will then spiral upwardly, entering the bore 29, passing upwardly therethrough and discharging from the nipple 32. Incidentally, when the suspension is forced at the bottom of the tube to move inwardly and to occupy the core of the outer annulus, its angular velocity will be increased by reason of the fact that its energy content will not, in general, be reduced to the same extent as the moment of inertia of the cross section it must now occupy.

Considering the downwardly spiralling outer whirl, the particles of suspension contained therein will be exposed to centrifugal force by reason of the angular velocity. Particles of the suspensoid which are of greater specific gravity than the suspending liquid will tend to move to the periphery of the tube. The velocity of this radial movement depends upon several well-known factors including the size of the suspended particles, their specific gravity relative to the suspending liquid, the viscosity of the liquid and the multiplication of the force of gravity accomplished by the device. The time required for the radial subsidence—the separation—of the particles obviously depends upon this radial velocity and the distance they must travel to reach the periphery of the tube.

For any given set of characteristics of liquid and suspended particles, the time required to accomplish this radial precipitation is therefore directly proportional to some power (the square root, for high velocity precipitation) of the centrifugal force and inversely proportional to the travel distance. That is, the whirl should have high angular velocity and the annulus occupied by the whirl should be radially thin.

The length of the tube is such that, by the time the outer whirl reaches the bottom, the separable fraction will occupy the peripheral zone thereof. It is then necessary to by-pass this heavy fraction and in the present invention that is accomplished by the novel method of providing a circumferential slot in the tube, adjusting the width of this slot to pass the largest particles to be removed and restricting the flow of liquid through the slot by control of the pressure drop therethrough. The delivery of liquid through this slot will depend on the area thereof and the pressure differential across it. I prefer to control this delivery by controlling one or both of these factors.

When two immiscible liquids of different specific gravity are to be separated as, for example, cream and milk, it is conceivably possible to control the desired fractionation by the adjustment of either one of these factors. When the solid particles of a suspension are to be separated, the slot must be wide enough to pass them. Such a width, without pressure control, may permit an undesirably great amount of suspending liquid to pass through the slot also. As the width of the slot is increased and it is attempted to control the passage of material therethrough solely by regulation of the pressure at the discharge side of the slot, there may be set up eddy currents back and forth through the slot with the effect of disturbing the separation of heavy and light fractions. Hence, as stated, I prefer to control both the area of the slot and the back-pressure on it.

Referring now to the preferred constructional form of the skimming slot, the lower end of the tube 1 is sweated or otherwise sealed into the block 3, the block being bored at 45 to receive the reduced end 46 of the tube. The central portion of the block is provided with an enlarged annular discharge space 47 which surrounds the lower end 45 of tube 1. A tangential outlet 48 leads from the space 47 and communicates with a discharge pipe 49. The skimming slot or discharge orifice 50 is thus formed between the lower end of the tube 1 which is chamfered downwardly and outwardly and the upper end of the cup-shaped skimmer member 51 which is cooperatively chamfered at 52 to provide the downwardly and outwardly inclined circumferential slot 50 at the bottom of the tube 1.

The width of slot 50 is determined by the distance between the fixed bottom end of tube 1 and the upper edge 52 of member 51 and, in accordance with the invention, said distance is variable and selectively controllable to regulate the width of the slot in accordance with the requirements of the separating process. For this purpose the downwardly projecting shank 54 of the skimmer member 51 is threaded into an appropriately tapped bore 55 in the bottom of block 3 whereby turning of the projecting end 56 will cause member 51 to be raised or lowered in the bored recess 57 of the block. A suitable lock nut 58 is designed to maintain member 51 in the selected position.

As hereinabove stated the invention also provides for regulating the discharge of the separating fraction through the slot 50 by regulation of the pressure drop or pressure differential through the slot. That is, a counterpressure is maintained in the chamber 47 at the periphery of the slot 50 which pressure is controllable between desired limitations, but of course will always be less than the expelling pressure of the centrifugally impelled fluid at the inside or mouth of the slot 50 within the tube. The counter pressure used to regulate the discharge of material through the slot may be supplied from any suitable source, but I prefer to utilize a pressure to be found at some suitable point in the separating system.

As embodied, the separator, including the units 1, 2 and 3 hereinabove described, comprises part of a separating system. The other elements of said system comprise essentially the feed-pressure creating means 22 described above, and the counter-pressure and dirt-collecting tank 60 (Fig. 1). The central cylindrical portion of said tank 60 is connected to the outlet of the skimmer discharge pipe 49. The lower portion 61 of the tank is tapered downwardly to communicate with an outlet pipe 62. A variably positionable hand valve 63 controls the drainage from the bottom of the tank. The top of the tank 64 is tapered upwardly from the inwardly disposed flange 67 at the upper end of the cylinder 60 and is provided with an outlet pipe 65 at its upper end. A depending annular baffle 66 is spaced a short distance from the inner cylindrical wall 60 of the tank and extends from the flange 67 downwardly about halfway, thus acting to baffle the incoming flow of fluid from the discharge pipe 49.

The upper outlet pipe 65 from the tank 60 communicates by return pipe 70 with the intake side of the feed pump 22, thereby providing for return flow of fluid from the top of the tank 60 for re-circulation through the separating system. Regulation of flow through the line 65—70 is provided by the hand valve 71. Additional regulation of such flow and, consequently, of the pressure head within the tank 60, may be provided by a pressure regulator between the valve 71 and the pipe 70. Said pressure regulator is conventionally shown as comprising a cylinder 72 having a weighted piston 73, the position of which is determined by the variable weights 74 hung at the end of pivoted arm 75 and opposed by the fluid pressure within the cylinder 72.

Referring now to the operation of the system above described, the tank 60 provides means for effecting final separation of the heavy impurities which have been discharged through the skimmer slot 50 together with a certain fraction of the suspension fluid. The pressure within the tank 60, controlled by the valve 71 and the pressure regulator 73, serves to provide a predetermined lower pressure in the discharge line 49, and thereby gives the necessary pressure differential across the skimmer slot 50. It will be clear that the connection of the tank 60 to the suction line of the pump provides a low pressure condition in the return line and insures the possibility of maintaining a controllable pressure differential across the skimming slot. While shown connected to the intake pipe of the pump, the tank return line may be connected to any part of the feed line system wherein the pressure is sufficiently lower than it is within the tube 1 at the location of the slot 50. In many installations such a point can be found where the pressure is just the desired amount to give the necessary pressure differential across the slot and in such cases the pressure regulator 73 may be dispensed with.

It is manifestly impracticable, if not impossible, to adjust the slot 50 or the pressure drop across it to such a degree of accuracy that only dirt particles would be withdrawn. The practical method is to withdraw a larger and controllable fraction of the total flow—but still a very small proportion of this total flow—and to subject this fraction which contains desirable fibre to a secondary separation.

Operation of the device for this purpose is as follows: As the total flow of raw stock spins down in the tube 1, the dirt particles are moved to the periphery of the tube. Valve 63 of the dirt collector is closed and valve 71 is opened. The pressure regulator controls the rate of flow through the tube slot, as described above. In some cases the pressure regulator may be omitted and the rate of flow controlled by the adjusted opening of valve 71.

As the comparatively small separated fraction containing dirt, fibre and water enters the tank 60, it meets depending baffle 66, turns downwardly, then reverses in direction and moves upwardly toward the top of the tank. The reversal of direction tends to drop out the heavier impurities, especially as the cross-sectional area of the tank is so proportioned to the rate of flow therethrough that the velocity of the rising liquid in the tank is less than the precipitation velocity of the dirt particles but greater than the precipitating rate of the lighter fibre particles. In a word, the tank acts as an elutriator for the separated fraction. Because this separated fraction is a very small proportion of the total flow of stock, the size of this elutriating tank is proportionately less than that of a tank which would be required if the total stock flow were to be elutriated.

The dirt particles thus separated settle to the bottom of the tank where they may be drawn off at intervals by opening valve 63. The need to discharge impurities is obviously very infrequent in view of their small volume. The fibre and water are discharged from the top of the tank, returned to the intake side of the pump and passed again through the tube. Thus, any dirt particles which may have been entrained in the fibre rising in the tank will be subjected to a re-treatment.

For the treatment of two immiscible liquids, or for the separation of solid particles from a suspension which contains only particles which are to be removed from the suspending liquid, as distinguished from paper pulp suspension wherefrom only a part of the particles—the impurities—are to be removed, it is necessary only to adjust the flow through the slot so as to remove the solids together with more or less of the suspending liquid in order that the withdrawn portion may be fluent. In such cases, the dirt collecting tank may be dispensed with or may be used merely as a ballast device in the following manner:

The upper valve 71 may be closed when, on starting up, the tank is only partially filled with liquid, thus providing an air cushion in the top of the tank. Valve 63 may then be opened an amount necessary to draw through the tube slot the desired flow-rate of concentrate. More simply, the tank may be eliminated and the fractionating valve may be placed directly on the skim-spout.

A modified form of separator embodying the invention is shown in Figs. 5 and 6, in which the separating tube is so constructed that there is no reversal of the axial motion of the whirling liquid. As embodied, said separator comprises a tube 80 which may be of equal or greater diameter than the tube 1. The upper or feed end of the tube is provided with a cylindrical cap 81, the upper end 82 of which is closed, while the lower end is recessed to tightly fit on the top of the tube 80. A tangential feed nozzle 83 leads into the cap 81 below the top thereof. A conical core 85 is provided centrally of the cap 81 to form a downwardly narrowing passageway for the injected liquid. A helical thread 86 is formed about the core 85 and extends radially from the surface thereof to meet the inner cylindrical surface of the cap 81 thereby to form a closed, downwardly disposed helical conduit for the liquid introduced by the nozzle 83. The thread or vane 86 terminates near the bottom of the core 85 which is at the upper end of the separating tube 80. It will be clear that the above-described means affords a passage for guiding and preforming the injected liquid into the desired annular swirl and for feeding it into the upper end of the smooth separating tube 80 at the desired high angular velocity.

A simple form of skimming orifice is shown at the lower end of the tube 80. The lower end of the tube is seated on a shoulder 90 formed in a collar member 91, the upper part 92 of the bore of said collar being flush with the inner surface of tube 80. A downwardly and outwardly inclined annular skimming slot 93 is formed in the collar 91, said slot communicating exteriorly with an annular passage 94 formed in a conforming bulge in the collar. The lower lip of the slot is formed as the upper edge of a second collar 95 axially disposed with respect to the collar 91 and having a radially disposed flange which rests against the lower edge of collar 91. The interior of collar 95 is bell-mouthed, its diameter tapering from the maximum at the edge of the slot 93 to a somewhat smaller diameter a short distance below, thereby providing some resistance to the rapid escape of the swirling fluid in the neighborhood of the skimming slot. The open bottom of the collar 95 is attached to a discharge pipe 97 of diameter somewhat less than that of the tube 80 and having its inner surface flush with the meeting bore of collar 95.

Means for providing the desired back pressure or pressure drop control on the skimming slot 93 comprises the skimming outlet 100 communicating with the skimming passageway 94 and leading into the settling tank 60 as shown. It will be understood that the remaining features of the apparatus will be as hereinbefore described and shown in Fig. 1.

Figure 7:
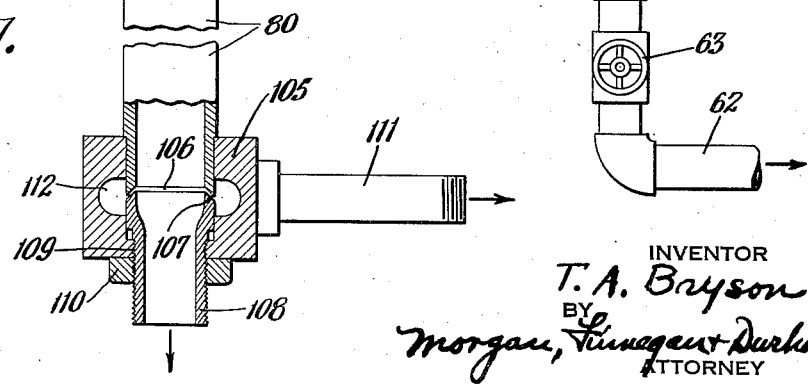
Fig. 7 is a view in elevation of a separator similar to that shown in Fig. 5, but having a modified form of discharge means which is shown in section.

In Fig. 7 there is shown another modification in which the single-pass type of separator generally disclosed in Figs. 5 and 6 is shown provided with means for varying the width of the skimming gap. As embodied, the lower end of the tube 80 is received in a block 105 generally similar in construction to the block 3, Figs. 2 and 4. The upper beveled edge of the skimming outlet 106 is formed at the bottom of the tube, while the lower conformingly beveled edge 107 of the slot is formed at the top of the axially disposed outlet tube 108. Tube 108 is exteriorly threaded in its lower portion for threaded engagement with the conforming bore 109 of the block 105; thereby providing means for vertical spacing and positioning movement of the tube 108. A lock nut 110 is provided for holding the tube 108 in any predetermined position. The upper portion of tube 108 is flared so that its upper diameter conforms to and is flush with the inner surface of the tube 80, while the lower portion of 108 is of lesser diameter to provide a somewhat restricted outlet for the downward passage of the discharging fluid. A discharge pipe 111 for the skimmed-off fraction communicates with the annular skimming chamber 112 in the block 105.

There are some advantages in the single-pass type of separator in that the friction of the downwardly and upwardly moving, concentric, columns of whirling liquid, found in the double-pass form (Fig. 2), are avoided. The consequent disturbance at the interfaces of these columns is thus obviated, while the bore of the discharging pipes 97 (Fig. 5) or 108 (Fig. 7) may be made sufficiently large that any disturbance incident to restriction of the whirling of fluid at the bottom of the tube will be under control.

The invention in its broader aspects is not limited to the specific mechanisms shown and described but departures may be made therefrom within the scope of the accompanying claims without departing from the principles of the invention and without sacrificing its chief advantages.

What I claim is:

1. In a vortex separator, in combination, a hollow cylinder of small diameter compared to its length, a conduit for delivering fluid under pressure head, a nozzle connected to the conduit and tangentially disposed with relation to the inner wall of said cylinder near one end thereof for converting said pressure head substantially entirely to velocity head and for injecting said high velocity stream of fluid normal to the axis of the cylinder, a helical conduit mounted coaxially within the cylinder and communicating with the delivery end of the nozzle for preforming said velocity stream into a compact, rapidly whirling annulus at the inlet portion of the cylinder, the other end of said helical conduit communicating with the inner wall of the cylinder to cause said annulus to travel along said inner wall throughout the length of the cylinder, an outlet for the fluid at one end of the cylinder after said annulus has travelled the length thereof and another outlet for particles centrifugally separated from the annulus during its travel within the cylinder.

2. In a vortex separator, in combination, a hollow cylinder of small diameter compared to its length, a conduit for delivering fluid under pressure head, a nozzle connected to the conduit and tangentially disposed with relation to the inner wall of said cylinder near one end thereof for converting said pressure head substantially entirely to velocity head and for injecting said high velocity stream of fluid normal to the axis of the cylinder, a helical conduit mounted coaxially within the cylinder and communicating with the delivery end of the nozzle for preforming said velocity stream into a compact, rapidly whirling annulus at the inlet portion of the cylinder, the other end of said helical conduit communicating with the inner wall of the cylinder to cause said annulus to travel along said inner wall throughout the length of the cylinder, said helical conduit having a cross-section substantially the same as that of the delivery end of said nozzle, an outlet for the fluid at one end of the cylinder after said annulus has travelled the length thereof and another outlet for particles centrifugally separated from the annulus during its travel within the cylinder.

3. In a vortex separator, in combination, a relatively long hollow cylinder of small diameter, means for forcing fluid under pressure tangentially against the inner wall of said cylinder near one end thereof to cause the fluid to travel in a helical path along said inner wall throughout the cylinder including means for injecting fluid in a high-velocity stream normal to the axis of the cylinder and means for preforming said stream into a compact, rapidly whirling annulus as it enters the cylinder, said preforming means comprising a helical conduit connecting the injecting means with end of the cylinder, and means comprising a narrowing annular passageway between said helical conduit and the end of the cylinder for increasing the angular velocity of the whirling fluid annulus as it passes from said preforming means to the cylinder.

4. In a vortex separator, in combination, a relatively long hollow cylinder of small diameter, means for forcing fluid under pressure tangentially against the inner wall of said cylinder near one end thereof to cause the fluid to travel in a helical path along said inner wall throughout the cylinder including a fluid-injecting nozzle disposed normal to the axis of the cylinder, an annular conduit having tangential communication with said nozzle and disposed above the upper end of the cylinder, the upper portion of said conduit being of greater diameter than the cylinder and tapering downwardly to the interior diameter of the cylinder at the lower end of the conduit, the upper end of said conduit being closed to prevent upward axial flow of injected fluid.

5. In a vortex separator, in combination, a relatively long hollow cylinder of small diameter, means for forcing fluid under pressure tangentially against the inner wall of said cylinder near one end thereof to cause the fluid to travel in a helical path along said inner wall throughout the cylinder including a fluid-injecting nozzle disposed normal to the axis of the cylinder, an annular conduit having tangential communication with said nozzle and disposed above the upper end of the cylinder, the upper portion of said conduit being of relatively large cross section and tapering in cross section downwardly to a minimum where it meets the upper end of the cylinder, the upper end of said conduit being closed to prevent upward axial flow of injected fluid.

6. In a vortex separator, in combination, a relatively long hollow cylinder of small diameter, means for forcing fluid under pressure tangentially against the inner wall of said cylinder near one end thereof to cause the fluid to travel in a helical path along said inner wall throughout the cylinder including a fluid-injecting nozzle disposed normal to the axis of the cylinder, an annular conduit having tangential communication with said nozzle and disposed above the upper end of the cylinder, the upper portion of said conduit being of relatively large cross section and tapering in cross section downwardly to a minimum where it meets the upper end of the cylinder, the upper end of said conduit being closed to prevent upward axial flow of injected fluid and a passageway coaxial with the cylinder and the conduit for discharging the upwardly swirling core of fluid which has passed through the cylinder.

7. A vortex separator including in combination a hollow cylinder of small diameter compared to its length, means for forcing fluid containing suspended particles of different specific gravities in a helical path along the inner wall of the cylinder throughout its length from the top to the bottom of the cylinder, thereby to effect centrifugal displacement toward the cylinder wall of heavier particles suspended in the fluid, and means for discharging such heavier particles from the periphery of the whirling fluid comprising a discharge orifice in the wall of the cylinder, and means for delivering the fluid and lighter suspended particles axially of the cylinder.

8. A vortex separator including in combination a hollow cylinder of small diameter compared to its length, means for forcing fluid containing suspended particles of different specific gravities in a helical path along the inner wall of the cylinder throughout its length, thereby to effect centrifugal displacement toward the cylinder wall of heavier particles suspended in the fluid, and means for discharging such particles radially outwardly from the periphery of the whirling fluid comprising an annular discharge orifice in the wall of the cylinder, and means for discharging the remaining fluid at another point.

9. A vortex separator including in combination a hollow cylinder of small diameter compared to its length, means for forcing fluid containing suspended particles of different specific gravities in a helical path along the inner wall of the cylinder throughout its length, thereby to effect centrifugal displacement toward the cylinder wall of heavier particles suspended in the fluid, said inner wall being smooth and unobstructed throughout and means for discharging such particles from the periphery of the whirling fluid comprising a discharge orifice in the wall of the cylinder, and extending for a substantial distance circumferentially thereof, and means for discharging the remaining fluid at an end of the cylinder.

10. A vortex separator including in combination a hollow cylinder of small diameter compared to its length, means for forcing fluid containing suspended particles of different specific gravities in a helical path along the inner wall of the cylinder throughout its length, thereby to effect centrifugal displacement toward the cylinder wall of heavier particles suspended in the fluid, and means for discharging such particles radially outwardly through the wall of the cylinder from the periphery of the whirling fluid comprising an annular beveled discharge orifice in the wall of the cylinder, and means for discharging the remaining fluid at an end of the cylinder.

11. A vortex separator including in combination a hollow cylinder of small diameter compared to its length, means for forcing a liquid-solid suspension in a helical path along the inner wall of the cylinder throughout its length, thereby to effect centrifugal displacement toward the cylinder wall of particles of relatively high specific gravity suspended in the fluid, and means for discharging such particles from the periphery of the whirling fluid comprising a discharge orifice in the wall of the cylinder and means for varying the size of said orifice, and means for discharging the remaining fluid at an end of the cylinder.

12. A vortex separator including in combination a hollow cylinder of small diameter compared to its length, means for forcing fluid containing suspended particles of different specific gravities in a helical path along the inner wall of the cylinder throughout its length, thereby to effect centrifugal displacement toward the cylinder wall of heavier particles suspended in the fluid, and means for discharging such particles from the periphery of the whirling fluid comprising an annular discharge orifice through the wall of the cylinder and means for varying the size of said orifice, and means for discharging the remaining fluid at an end of the cylinder.

13. A vortex separator including in combination a hollow cylinder of small diameter compared to its length, means for forcing fluid containing suspended particles of different specific gravities in a helical path along the inner wall of the cylinder throughout its length, thereby to effect centrifugal displacement toward the cylinder wall of heavier particles suspended in the fluid, and means for discharging such particles radially outwardly from the periphery of the whirling fluid comprising an annular discharge orifice through the wall of the cylinder and means for varying the size of said orifice comprising an axially movable member co-axial with the cylinder, and means for discharging the remaining fluid at an end of the cylinder.

14. A vortex separator including in combination a hollow cylinder of small diameter compared to its length, means for forcing fluid in a helical path along the inner wall of the cylinder throughout its length, thereby to effect centrifugal displacement toward the cylinder wall of heavier particles suspended in the fluid, and means for discharging such particles from the periphery of the whirling fluid comprising a discharge opening communicating with the cylinder and extending for a substantial distance about the periphery thereof and means for controlling the pressure head in the fluid discharging from said opening, and means for discharging the remaining fluid at an end of the cylinder.

15. A vortex separator including in combination a hollow cylinder of small diameter compared to its length, means for forcing fluid in a helical path along the inner wall of the cylinder throughout its length, thereby to effect centrifugal displacement toward the cylinder wall of heavier particles suspended in the fluid, and means for discharging such particles from the periphery of the whirling fluid comprising a discharge opening communicating with the cylinder for the passage of fluid containing such particles and means for controlling the pressure drop through said opening by regulating the pressure head in the fluid at the discharge side of said opening, and means for discharging the remaining fluid at an end of the cylinder.

16. A vortex separator including in combination a hollow cylinder of small diameter compared to the length, means for forcing fluid in a helical path along the inner wall of the cylinder throughout its length, thereby to effect centrifugal displacement toward the cylinder wall of heavier particles suspended in the fluid, and means for discharging such particles from the periphery of the whirling fluid comprising a discharge opening communicating with the cylinder for the passage of fluid containing such particles and means for controlling the pressure drop through said opening by regulating the pressure head in the fluid at the discharge side of said opening, and means for discharging the remaining fluid at an end of the cylinder.

17. The method of separating heavy particles from a fluid suspension which comprises imparting a whirling helical motion to a body of the suspension and passing same axially along the inner wall of a cylinder, discharging centrifugally-subsided heavier particles from the periphery of said whirling body by passing them through an orifice in the wall of the cylinder and regulating the amount of such peripheral discharge flow by imposing a regulable pressure upon the fluid which emerges from said orifice, and separately discharging the effluent fluid.

18. The method of separating heavy particles from a fluid suspension which comprises imparting a whirling helical motion to a body of the suspension and passing same axially along the inner wall of a cylinder, discharging centrifugally-subsided heavier particles from the periphery of said whirling body by passing them through an orifice in the wall of the cylinder and regulating the amount of such peripheral discharge flow by imposing a regulable pressure upon the fluid which emerges from said orifice, causing the remaining body of the fluid to reverse its axial movement and return the length of the cylinder as an inner whirling core of fluid to discharge axially from the cylinder at the end which it originally entered.

19. The method of separating heavy particles from a fluid suspension which comprises imparting a whirling helical motion to a body of the suspension and passing same axially along the inner wall of a cylinder, discharging centrifugally-subsided heavier particles from the periphery of said whirling body by passing them through an orifice in the wall of the cylinder and regulating the amount of such peripheral discharge flow by imposing a regulable pressure upon the fluid which emerges from said orifice and discharging the remaining body of the fluid by continuing its axial movement in the same direction beyond the end of the cylinder.

20. The method of separating heavy particles from a fluid suspension which comprises imparting a whirling helical motion to a body of the suspension and passing same axially along the inner wall of a cylinder, discharging centrifugally-subsided heavier particles from the periphery of said whirling body by passing them through an orifice in the wall of the cylinder and regulating the amount of such peripheral discharge flow by imposing a counter pressure upon the fluid which emerges from said orifice and by varying the size of the orifice, and separately discharging the effluent fluid.

21. A vortex separator including in combination a hollow cylinder of a length several times its diameter, means for forcing fluid containing suspended particles of different specific gravities in a helical path along the inner wall of the cylinder throughout its length, thereby to effect centrifugal displacement toward the cylinder wall of heavier particles suspended in the fluid, and means for discharging such particles radially outwardly from the periphery of the whirling fluid comprising an annular discharge orifice through the wall of the cylinder and means for varying the cross-section of said orifice by varying the axial width thereof along the wall of the cylinder, and a discharge for the effluent fluid at one end of the cylinder.

22. A vortex separator including in combination a hollow cylinder of a length several times its diameter, means for forcing fluid containing suspended particles of different specific gravities in a helical path along the inner wall of the cylinder throughout its length, thereby to effect centrifugal displacement toward the cylinder wall of heavier particles suspended in the fluid, and means for discharging such particles radially outwardly from the periphery of the whirling fluid comprising an annular discharge orifice through the wall of the cylinder and means for varying the size of said orifice comprising a member spaced from the lower end of the cylinder and constituting a spaced extension of the cylinder walls, said member being movable axially toward and away from the end of the cylinder, and a discharge for the effluent fluid at one end of the cylinder.

23. The method of separating heavy particles from a fluid suspension which comprises imparting a whirling helical motion to an annular body of said fluid and passing same axially within a cylinder, thereby to cause the heavy particles to be urged to the periphery of the annulus by centrifugal action, separating said peripherally stratified heavy particles from the annulus by peeling off and centrifugally discharging the peripheral layer of said annulus, and controlling the radial thickness of said peeling action by varying the size of the peripheral discharge outlet and by imposing a regulable counterpressure to the centrifugal separating force thereby to regulate the pressure drop across the discharge orifice.

TANDY A. BRYSON.